July 12, 1960  E. F. W. MOELTZNER ET AL  2,944,450
APPARATUS FOR FEEDING AND ROLLING WORKPIECES
Filed June 30, 1953  2 Sheets-Sheet 1

INVENTORS
ERNST FRITZ WILHELM MOELTZNER
KURT LIEDTKE
BY *Strauch, Nolan & Diggins*
ATTORNEYS July 12, 1960 E. F. W. MOELTZNER ET AL 2,944,450
APPARATUS FOR FEEDING AND ROLLING WORKPIECES
Filed June 30, 1953 2 Sheets-Sheet 2

INVENTORS
ERNST FRITZ WILHELM MOELTZNER
KURT LIEDTKE
BY Strauch, Nolan + Diggins
ATTORNEYS United States Patent Office 2,944,450
Patented July 12, 1960

2,944,450
APPARATUS FOR FEEDING AND ROLLING WORKPIECES

Ernst Fritz Wilhelm Moeltzner, Berlin-Charlottenburg, and Kurt Liedtke, Berlin-Wilmersdorf, Germany, assignors, by mesne assignments, to Landis Machine Company, Waynesboro, Pa., a corporation of Pennsylvania Filed June 30, 1953, Ser. No. 365,049

Claims priority, application Germany July 14, 1952

6 Claims. (Cl. 80—6)

The present invention relates to apparatus for feeding and rolling work pieces and more specifically to improvements on the subject matter of copending application Serial Number 363,729, filed June 24, 1953, which concerns a mechanism with a transfer cylinder passing through the rolling space between two rolls and having on its circumference recesses for receiving work pieces fed from a magazine. The transfer cylinder is driven rotatively, via a friction drive, by the drive of an operating shaft. In each step by step advance of the transfer cylinder a work piece is transferred to a working position, where it is rolled while the transfer cylinder remains stationary. Upon further advance of the transfer cylinder the completely rolled work piece is carried away and a new work piece to be rolled is transferred. The production of the machine will be increased by the means of the main patent.

The primary purpose and object of the present invention resides in the provision of improvements over the invention disclosed and claimed in the aforesaid application Serial Number 363,729 which increase the rate of production possible in apparatus of this type. In the apparatus of the present invention the transfer cylinder receives a plurality of work pieces simultaneously in each rotative step and, upon further rotation, transfers them to operating position. In this position all transferred work pieces are supported by the transfer cylinder, while the cylinder remains stationary, and are rolled simultaneously. In this way the production is multiplied.

According to the invention, the mechanism for carrying out the process is constructed in such a manner that the transfer cylinder, which surrounds one roll and has carriers on its circumference for the work pieces to be rolled, has a plurality of feeding means (magazines) and locking means corresponding in spacing to the length of the step required for transferring a plurality of work pieces. The transfer cylinder passes through a plurality of rolling spaces between the rolls. If two rolling spaces adjoin the transfer cylinder, the production of the machine is nearly doubled. However, it is also possible to employ more than two rolling spaces, so that the production of the machine may be further increased. The passage of the increased length of travel of the transfer cylinder corresponding to the increased step length is of only slight importance in the whole cycle since this length can be held to a minimum or it is possible to increase the speed of the transfer cylinder. The invention is not confined to the use of rolls having on their circumference profile segments rising spirally in accordance with the depth to be rolled (profile segment rolls). An advantageous embodiment of the mechanism is one in which the step length of the transfer cylinder is greater than the distance between two successive carriers and an index plate with $n/x$ indexing means is connected to the transfer cylinder, where $n$ is the number of carriers and $x$ the number of work pieces to be rolled simultaneously. It is possible to arrange in opposition to the roll surrounded by the transfer cylinder, two or more rolls of a smaller diameter, said rolls being opposed to the carriers in the locked position of the transfer cylinder, so that the axes of the work pieces lie in the planes passing through the axes of the rolls. In this case the roll surrounded by the transfer cylinder may be formed cylindrically and the rolls of smaller diameter may be formed with spirally rising surfaces. The optimum output depends upon the length of rolling path necessary and upon the total travel caused by the greater step length. In order to hold this to a minimum, it is to advantage to cause the step length necessary for transferring a plurality of work pieces to pass by at a speed greater than that of the rolls. The total travel can also be reduced by forming the carriers on the transfer cylinder with unequal spaces between the work pieces and arranging each two carriers a smaller distance apart and these pairs a greater distance apart. The step length is reduced by this arrangement. The step length may be shortened still further if a cylindrical, centrally arranged roll with transfer cylinder having equally spaced carriers, is opposed to a plurality of rolls, preferably profile segment rolls, with an equal number of feeding means (magazines) arranged between these rolls. It is also possible to position two work pieces in the transfer cylinder at equal distances above and below the plane passing through the axes of two cylindrical rolls, when the transfer cylinder is in locked position.

In order to avoid loading troubles it is of advantage to provide the feeding means (magazines) with controllable escapement means for the work pieces which free the bottom work pieces in the feeding means when the transfer cylinder is stationary and which close the feeding means during movement of the cylinder.

The subject matter of the invention is shown in the drawings in several exemplary embodiments. In the drawings, Fig. 1 shows a mechanism operating with one cylindrical roll and two small rolls having spirally rising surfaces, together with cam control means with a transfer cylinder having equal divisions, Fig. 1a is a view of a part of Fig. 1 to an enlarged scale, Fig. 2 is another embodiment similar to Fig. 1, in which the transfer cylinder has unequal divisions, Figure 3 is a section taken along line 3—3 of Figure 1 showing details of construction.

Figure 1A:
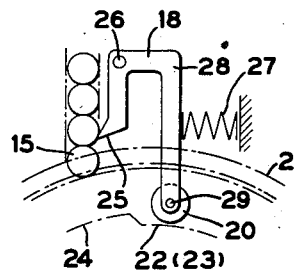
Figure 5:
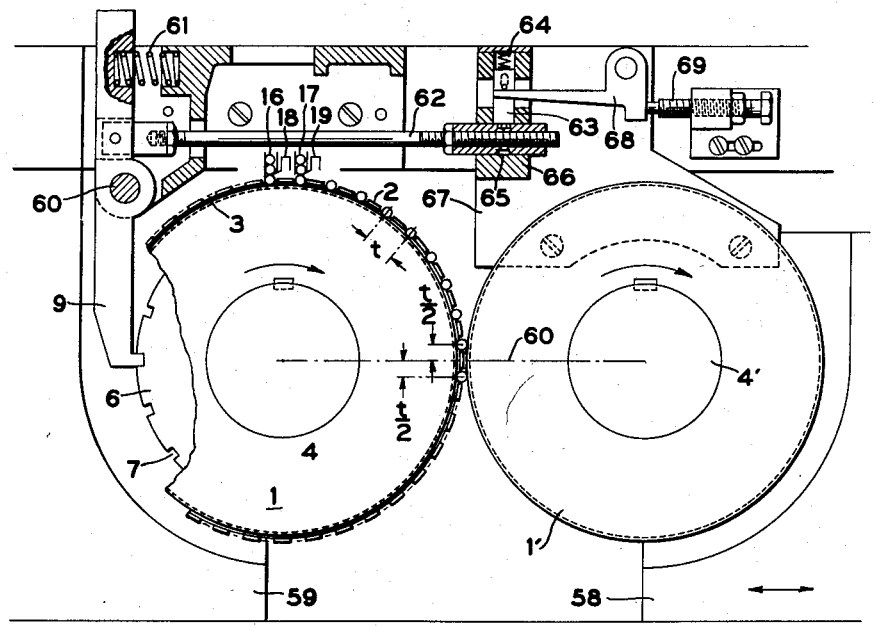
Fig. 5 is another embodiment with two cylindrical rolls.

The rolling tool 1 is surrounded by the transfer cylinder 2, which has the carriers 3 evenly spaced on its circumference. The roll is secured on the drive shaft 4 by the key 5. The transfer cylinder is connected to the index plate 6 having the index grooves 7 which are engaged by the projection 8 of the locking lever 9 which is mounted for pivotal movement about a fixed axis by any suitable means, for example, as shown in Figure 5. The lever 9 carries a roller 10 which engages cams 12 mounted on the control disc 11 to thereby control the locking lever. The control disk 11, together with the roll 1 rotates in the direction of the arrow 13. A friction drive is disposed between the roll and the transfer cylinder and the friction disk thereof is designated by 14. The friction drive carries the transfer cylinder along in the direction of the arrow when the index plate is unlocked. The work pieces 15 are conveyed to the transfer cylinder by the magazines 16 and 17. The magazines are so arranged that they are positioned above two adjacent carriers 3 in the locked position of the transfer cylinder. The work pieces in the magazines 16 and 17 are retained therein by controllable latches 18 and 19 and only the bottom work piece is released each time the transfer cylinder is stopped. Trouble-free loading of the transfer cylinder is thereby effected. Moreover, the transfer cylinder, in its rotation, is relieved of the weight of the work pieces in the magazine. The rollers 20 and 21 of the latches 18 and 19 lie in different planes and engage simultaneously the recesses 22 and 23 of the control disks 24. The control disks 24 rotate together with the control disk 11 in the direction of the arrow 13. Both control disks 24 are positioned with respect to the control disk 11 in such a way that the recesses 22 and 23 operate the latches 18 and 19 first so that the magazines 16 and 17 are locked before the index plate 6 is unlatched. After the index plate is again latched the magazines 16 and 17 are reopened so that the next work piece falls from each magazine into the vacant transfer recesses. Such an escapement mechanism is shown in Figure 1a. The latch 18 is mounted for rocking movement about the center of rotation 26. It carries at its lower end the roller 20 which is mounted on the pin 29 and which rolls on one of the control disks 24. The short leg of the latch 18 (19) carries the stopping projection 25. The latch is engaged by the compression spring 27 in opposition to the automatic unlatching force and this spring presses against the right leg 28 of the latch. The latches 18 and 19 are briefly actuated by the recesses 22 and 23 upon rotation of the control disks 24 which are mounted one behind the other.

The cylindrical roll 1 faces the rolls 30 and 31; these latter are of smaller diameter and have circumferential surfaces which rise spirally from the beginning 32′ to the end 32″ of the roll segment 32. The drive shafts 33 and 34 serve to drive these rolls; these shafts are driven, through a transmission (not shown), in the same direction of rotation as the roll 1, but at higher rotative speeds corresponding to their smaller diameters so that the circumferential speeds of all the rolls are the same. The blank spaces 35 and 36 are provided on rolls 30 and 31 for changing work pieces. In the locked position of the transfer cylinder 2, these rolls are disposed in opposition to two successive carriers 3, so that the axes of the work pieces 15′ and 15″, which are in operating position, lie in the planes 30′ and 31′ passing through the axes of the rolls.

Figure 1:
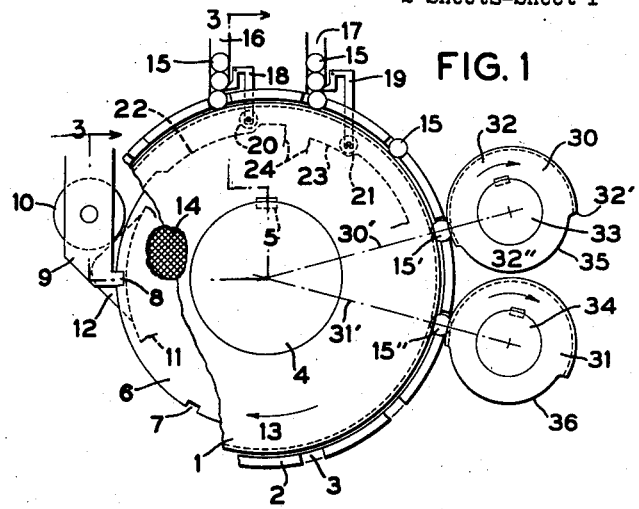
Figure 3:
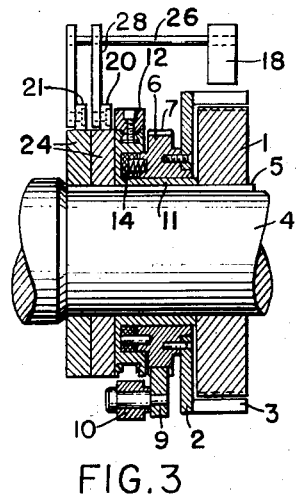
Figure 2:
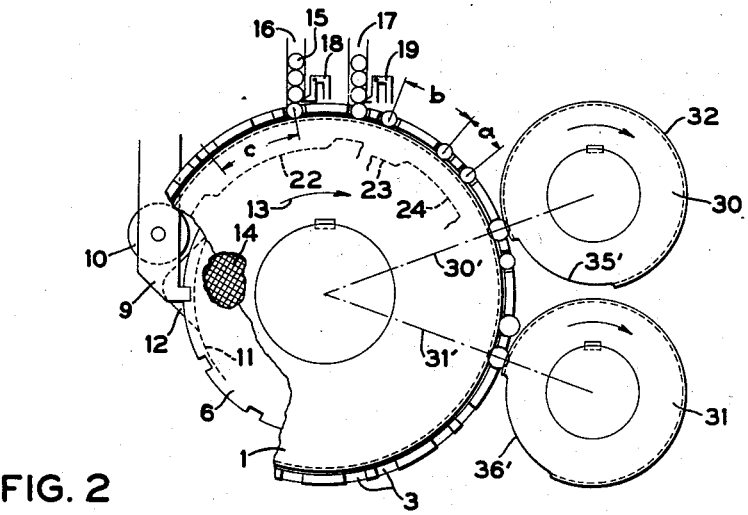

The embodiment of Figure 2 is distinguished by the fact that the transfer cylinder has unequally spaced carriers 3. Two adjacent carriers have the smaller spacing $a$ and are arranged in pairs wherein the distance between the adjacent carriers of two successive pairs is $b$, which is greater than $a$. The length of the step $c$ is equal to $a$ plus $b$. The blank spaces 35′ and 36′ on rolls 30 and 31 are shorter than in the embodiment of Fig. 1, due to the smaller idle space. The remaining structure of the mechanism is the same as in Fig. 1.

Figure 4:
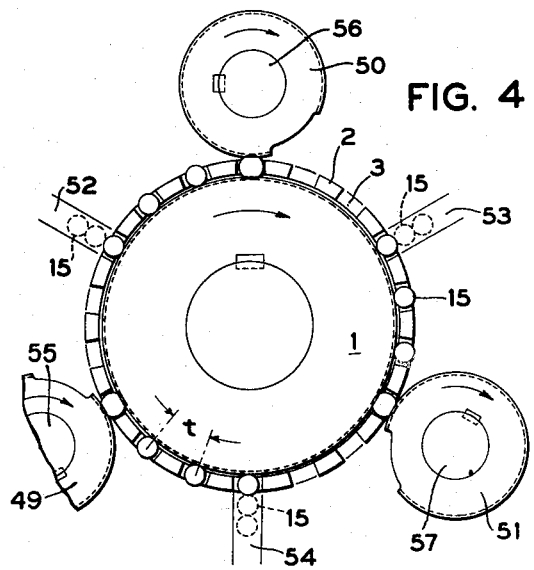
Fig. 4 is another embodiment with 3 profile segment rolls.

The embodiment shown in Figure 4 has the cylindrical roll 1 centrally arranged on the drive shaft; this roll is surrounded by the transfer cylinder 2 with the carriers 3. The carriers are arranged equidistantly on the circumference of the transfer cylinder. Three profile segment rolls 49, 50 and 51 are provided with three magazines 52, 53 and 54 arranged between the rolls. The ratchet wheel, the control disk and the locking lever are not shown for reasons of clarity. The length of the step $t$ of the transfer cylinder corresponds to the distance between two adjacent carriers. If the drive shafts 4, 55, 56 and 57 are disposed horizontally, the work pieces 15 are advanced from the magazine 54 with the aid of feeders (not shown). However, it is also possible to arrange all magazine feeds in such a way that the work pieces fall into the carriers 3 under the influence of gravity, particularly if the drive shafts are arranged vertically.

The embodiments shown in Figs. 1, 2 and 4 employ profile segment rolls which oppose a cylindrical roll and which are set at a fixed distance between their axes corresponding to the required width of rolling space.

The simultaneous feeding of two work pieces in one step of the transfer cylinder can also be accomplished by using two cylindrical rolls of equal size which are relatively movable toward and away from each other. An embodiment of this kind is shown in Figure 5. The rolls are designated by 1 and 1′ and the drive shafts by 4 and 4′. The roll 1′ with its drive is mounted on the slide 58 which is reciprocable in the direction of the arrow, while the roll 1 is journalled in fixed position in the machine frame 59. The transfer cylinder 2 has recesses 3, which are arranged equidistantly about the circumference. The work pieces 15 are fed from two magazines 16 and 17 into two carriers simultaneously. The control disk 6 has index grooves 7 which are so arranged that the locking lever 9 locks the transfer cylinder when two work pieces are disposed as equidistantly one half division above and below the plane 60, passing through the axes of the rolls. The number of carriers 3 on the transfer cylinder is double the number of the indexing means 7 on the index plate 6, so that the transfer cylinder, when unlocked, travels over a space equal to double the distance between two carriers. If $t$ is the distance between two carriers the length of the step of the transfer cylinder amounts to $2t$. The work pieces are retained by latches 18 and 19 during rotation of the transfer cylinder.

The locking lever 9 rocks about the axis 60 and is engaged by the compression spring 61; the lever is connected to the slide 58 by the connecting rod 62. The latching pin 63, which engages the annular groove 65 of the connecting rod by means of the spring 64, serves for this connection. The connecting rod is journalled in the bearing block 66 of the bracket 67, which is secured to the slide 58. For unlatching, a lever 68 is employed, which lever strikes the stationary abutment 69 when the slide is withdrawn and releases the connecting rod latch. The connecting rod connected to the slide has unlocked the locking lever 9 by withdrawal of the slide, so that the transfer cylinder rotates one step. When the slide, controlled by a timer mechanism, known per se, moves again into working position, the connecting rod 62 is again latched. The index plate 6 is again locked by the pressure of the spring 61, which causes the locking projection to engage the succeeding index groove. In this position of the transfer cylinder, two newly transferred work pieces are rolled.

The embodiment shown in Figure 5 is particularly useful for rolling work pieces of small diameter.

The rolls are formed generally as threading rolls and have a profile corresponding to the thread to be rolled. However, as a matter of principle, the rolls may also have other profiles; they can be used to roll up to a shoulder, for knurling, fluting or burnishing. The mechanism can be used on thread rolling machines.

We claim:

1. Apparatus for performing the same rolling operation simultaneously on a plurality of workpieces comprising a plurality of forming rolls; means mounting said rolls to form a plurality of work-forming stations spaced a predetermined circumferential distance about the axis of one of said rolls; a transfer cylinder surrounding one of said rolls, said transfer cylinder having a plurality of workpiece carriers so circumferentially spaced as to position one carrier at one of said work-forming stations when another carrier is positioned at another work-forming station; a plurality of workpiece feeding devices for feeding workpieces to said carriers so as to position said workpieces in said carriers in circumferentially spaced relation about the axis of said one roll which is surrounded by said transfer cylinder to provide at least for a leading workpiece and a trailing workpiece, the number of devices being equal to the number of work-forming stations and said devices being spaced about the circumference of said one of said rolls in predetermined relationship to the spacing of said work-forming station; and indexing means operable to periodically advance said transfer cylinder and for controlling the movement of said workpieces comprising means for controlling said work-feeding devices to feed unformed workpieces to selected ones of said carriers at predetermined intervals, means providing free movement of said workpieces past said rolls during an indexing movement, control means automatically controlling said indexing means and the rotation of said transfer cylinder in a predetermined direction to deliver in one indexing movement of said transfer cylinder unformed workpieces positioned in said carriers simultaneously to associated ones of said circumferentially spaced work-forming stations and thereafter rolling said workpieces at said stations wherein the leading one of said unformed workpieces is advanced in continuous movement through and beyond the first encountered work-forming station to the last encountered work-forming station and in the succeeding indexing movement that workpiece formed at its work-forming station and similarly fed and formed workpieces are advanced to a work removal station wherein the trailing one of said formed workpieces is advanced through and beyond succeeding work-forming stations to said work removal station.

2. The apparatus as defined in claim 1 wherein said first mentioned means includes means for bodily moving the other of said rolls to an inoperative position during indexing of said workpieces to thereby prevent a rolling operation from being performed.

3. Apparatus for performing the same rolling operation simultaneously on a plurality of workpieces comprising a plurality of forming rolls; means mounting said rolls to form a plurality of work-forming stations spaced a predetermined circumferential distance about the axis of one of said rolls; a transfer cylinder surrounding one of said rolls, said transfer cylinder having a plurality of workpiece carriers so circumferentially spaced as to position one carrier at one of said work-forming stations when another carrier is positioned at another work-forming station; a plurality of workpiece feeding devices for feeding workpieces to said carriers so as to position said workpieces in said carriers in circumferentially spaced relation about the axis of said one roll which is surrounded by said transfer cylinder to provide at least for a leading workpiece and a trailing workpiece, the number of devices being equal to the number of work-forming stations and said devices being spaced about the circumference of said one of said rolls in predetermined relationship to the spacing of said work-forming station; and indexing means operable to periodically advance said transfer cylinder and for controlling the movement of said workpieces comprising means for controlling said work-feeding devices to feed unformed workpieces to selected ones of said carriers at predetermined intervals, means providing free movement of said workpieces past said rolls during an indexing movement, control means automatically controlling said indexing means and the rotation of said transfer cylinder in a predetermined direction to deliver in one indexing movement of said transfer cylinder unformed workpieces positioned in said carriers simultaneously to associated ones of said circumferentially spaced work-forming stations and thereafter rolling said workpieces at said stations wherein the leading one of said unformed workpieces is advanced in continuous movement through and beyond the first encountered work-forming station to the last encountered work-forming station and in the succeeding indexing movement that workpiece formed at its work-forming station and similarly fed and formed workpieces are advanced to a work removal station wherein the trailing one of said formed workpieces is advanced through and beyond succeeding work-forming stations, to said work removal station and means responsive to said control means for operatively locking said cylinder to dispose at least two workpieces in adjacent carriers at a circumferential distance equal to the circumferential spacing between adjacent work-forming stations whereby said two adjacent workpieces are rolled simultaneously.

4. Apparatus for performing the same rolling operation simultaneously on a plurality of workpieces comprising a main cylindrical forming roll; a pair of smaller segmental forming rolls; means mounting said smaller rolls for rotation about fixed axes at points spaced about the circumference of said main roll to provide first and second work-forming stations between said main roll and said smaller forming rolls; a transfer cylinder surrounding said main roll; means forming a plurality of workpiece carriers on said work transfer cylinder, said carriers being so circumferentially spaced as to position one carrier at said first work-forming station when another carrier is positioned at said second work-forming station; a pair of workpiece feeding devices for feeding workpieces to said carriers so as to position said workpieces in said carriers in circumferentially spaced relation about the axis of said main roll to provide for a leading workpiece and a trailing workpiece, the spacing between said feeding devices being the same as the spacing between said smaller rolls and the spacing between said carriers; and indexing means operable to periodically advance said transfer cylinder and for controlling the movement of said workpieces comprising means for automatically controlling said work-feeding devices to feed unformed workpieces to adjacent ones of said carriers at predetermined intervals; means providing free movement of said workpieces past said rolls during an indexing movement; control means for automatically controlling said indexing means and the rotation of said transfer cylinder in a predetermined direction to deliver in one indexing movement of said transfer cylinder unformed workpieces positioned in said carriers simultaneously to associated ones of said circumferentially spaced work-forming stations and thereafter rolling said workpieces at said stations wherein the leading one of said unformed workpieces is advanced in continuous movement through and beyond said second work-forming station and in the succeeding indexing movement the workpieces formed at said work-forming stations are delivered to a work removal station.

5. The apparatus according to claim 1 wherein the circumferential spacing between the work feeding devices and between adjacent workpiece carriers is equal to the spacing between said work forming stations.

6. The apparatus according to claim 1 wherein the said carriers are arranged in pairs, the spacing between remote carriers of adjacent pairs being equal to the spacing between adjacent work forming stations.

References Cited in the file of this patent

UNITED STATES PATENTS

| | | |
|---|---|---|
| 248,163 | Harvey | Oct. 11, 1881 |
| 917,269 | Eden | Apr. 6, 1909 |
| 1,017,881 | Landis | Feb. 20, 1912 |
| 1,132,698 | Wilcox | Mar. 23, 1915 |
| 1,485,066 | Bricken | Feb. 26, 1924 |
| 2,009,751 | Stenman | July 30, 1935 |
| 2,086,128 | Hackbarth et al. | July 6, 1937 |
| 2,439,225 | Scrivener | Apr. 6, 1948 |
| 2,643,402 | Billow | Jan. 30, 1953 |
| 2,666,349 | Batchelder | Jan. 19, 1954 |

FOREIGN PATENTS

| | | |
|---|---|---|
| 495,407 | Belgium | Aug. 16, 1950 |
| 635,564 | Great Britain | Apr. 12, 1950 |